(12) United States Patent
LaMarca et al.

(10) Patent No.: US 6,795,786 B2
(45) Date of Patent: Sep. 21, 2004

(54) ROBOTIC SENSOR CALIBRATION SYSTEM

(75) Inventors: Anthony G. LaMarca, Seattle, WA (US); Gaetano Borriello, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 8 days.

(21) Appl. No.: 10/334,870

(22) Filed: Dec. 31, 2002

(65) Prior Publication Data

US 2004/0128097 A1 Jul. 1, 2004

(51) Int. Cl.[7] .............................................. G06F 15/00
(52) U.S. Cl. ..................................... 702/104; 700/217
(58) Field of Search ........................ 702/104; 700/217, 700/218

(56) References Cited

U.S. PATENT DOCUMENTS 6,591,160 B2 * 7/2003 Hine et al. .................. 700/218

* cited by examiner

Primary Examiner—Kamini Shah
(74) Attorney, Agent, or Firm—Joni D. Stutman-Horn

(57) ABSTRACT

In one embodiment a sensor calibration system includes a robotic platform able to navigate to sensors distributed throughout an environment. The sensors may measure, for example, acoustic levels, temperature, luminance, or humidity. The robotic platform is equipped with at least one set of calibrated sensors and is capable of maneuvering around the environment to respective positions adjacent to the sensors to perform on site calibration. Such proximity also permits recharging power supplies of sensors and download/upload of information to and from the sensor.

30 Claims, 4 Drawing Sheets

ROBOTIC SENSOR CALIBRATION SYSTEM

FIELD OF THE INVENTION

The present invention relates to robotic systems and sensor networks.

BACKGROUND

Sensor networks are increasingly being deployed to support home and office automation by passing data to and from remote sensor units. At the lowest level, a sensor unit's task is to measure some characteristic of the real world (temperature, elevation, humidity) and report it in either a machine or human readable form. Sensor units require calibration because the characteristic in question is typically not measured directly, but rather inferred by some physical phenomenon.

Sensor networks offer new ways to monitor our environment and do so continuously and invisibly. These networks have wide applicability including medical, industrial, scientific, military, and consumer applications. Currently developed applications include security and defense systems, or management of environmental control systems (lighting, heating, air conditioning, sound) in a home or large office. More advanced applications include biomedical monitoring of individuals in remote locations, toxicity monitoring, or monitoring of basic office information services such as availability of highly-coveted conference rooms.

However, most applications currently have viability problems related to deployment, security, calibration, failure detection and power management. Sensors must be calibrated, positioned, powered, and replaced when defective. While small numbers of hard wired sensors or wireless sensors can be manually maintained, such human intensive methods are costly when hundreds of widely distributed sensors must be maintained.

DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only.

DETAILED DESCRIPTION

Figure 1:
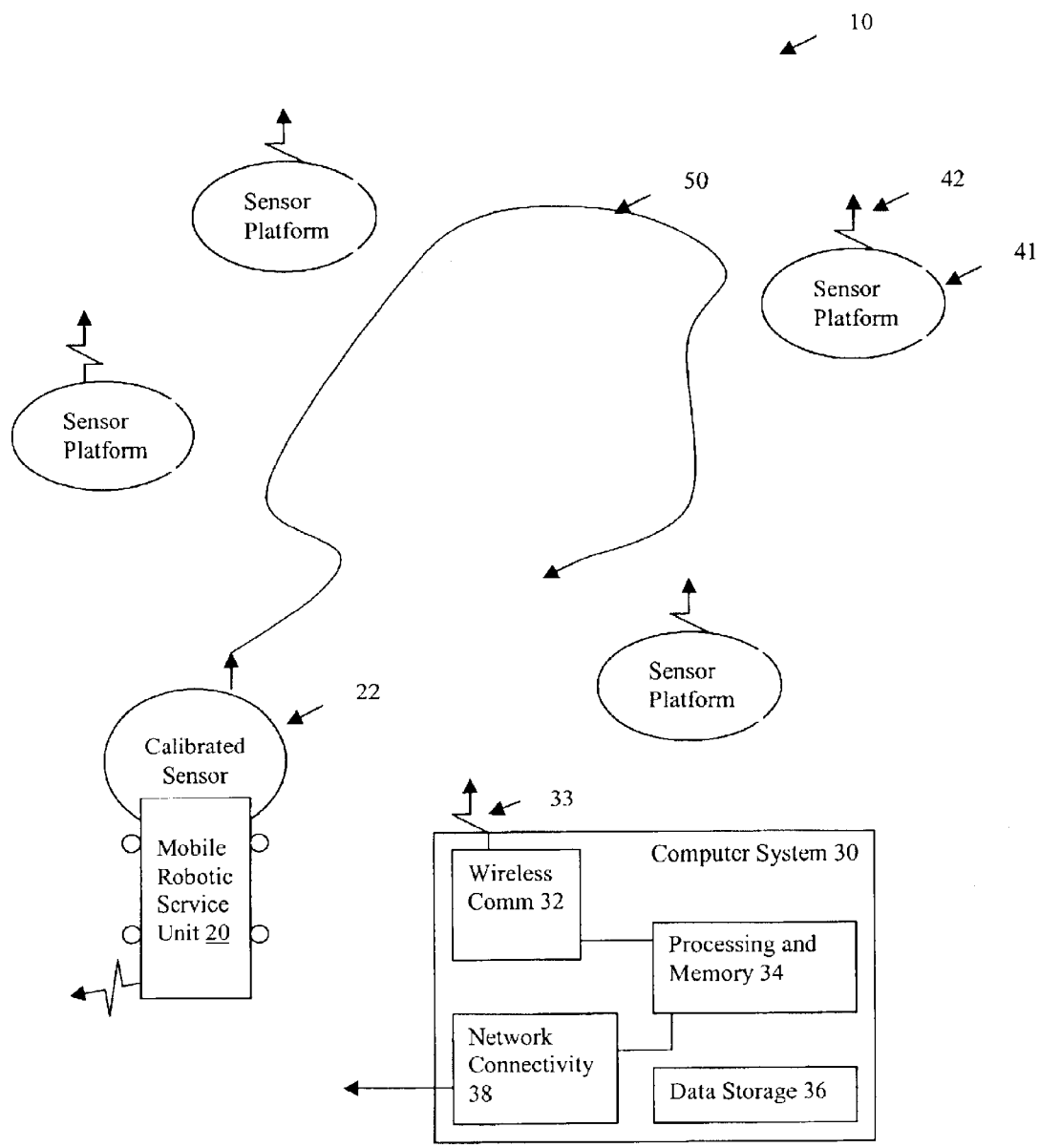
FIG. 1 schematically illustrates a robotically maintained and calibrated sensor system.

As illustrated in FIG. 1, sensor calibration system 10 includes a mobile robotic service unit 20 having an associated calibrated sensor 22. The robotic service unit 20 is capable of maneuvering (e.g. by path 50) around the environment to respective positions adjacent to various sensor platforms 41, and supports autonomous, semi-autonomous, or guided identification of sensor location for sensors distributed in an environment. Both the robotic service unit and the sensor platforms 41, which may include, for example, sensors for detecting temperature, water level, relative humidity, luminance, or vibration, are connected by wireless or wired links 42, to a computer system 30. The computer system 30 accordingly has processing and memory 34, along with data storage 36, to process information developed or associated with the sensor platforms and mobile robotic service unit, the information being received through wireless communication module 32 or via a wired network connection 38. Cooperation between the robotic service unit 20, sensor platforms 41, and computer system 30 permits operation of the robotic service unit 20 to calibrate sensors on the sensor platforms with respect to one or more calibrated sensors mounted on the robotic service unit.

In certain embodiments, such calibration can utilize information contained in a persistent calibration database (associated with either the mobile robotic unit, the sensor platforms, the computing system, or some distributed combination thereof); and set of calibration algorithms to monitor long term trends, determine failure modes, and provide preventative sensor platform maintenance. For example, when a reading is received from a sensor platform, a lookup with the sensor's unique identification is performed on a calibration database. The calibration data, along with the sensor reading, is fed into suitable calibration algorithms. The algorithms either produce an adjusted sensor reading or determine that there is insufficient calibration data. Adjusted readings are passed on to the consumers of the data (the application that indirectly use the sensors). If there is insufficient data, however, the location of the sensor is read from the localization system and the mobile robotic service unit 20 is deployed to this location (via path 50). After the calibrated sensor 22 on the mobile robotic service unit has had time to acclimate, the robots sensor and the uncalibrated sensor are read and this mapping is written to the calibration database. The algorithms are then re-consulted and the cycle repeats until an adjusted sensor reading is produced.

As will be appreciated, the computer system 30 and information processing centers respectively associated with the sensor platforms and mobile robotic service unit, include, but are not limited or restricted to a computer (e.g., desktop, a laptop, a server, blade server, a workstation, a personal digital assistant, embedded processing unit, etc.) or any peripherals associated therewith; communication equipment (e.g., telephone handset, pager, etc.); a television set-top box and the like. Furthermore, "connection" or "link" is broadly defined as a logical or physical communication path such as, for instance, electrical wire, optical fiber, cable, bus trace, or even a wireless channel using infrared, radio frequency (RF), or any other wireless signaling mechanism. In addition, the term "information" is defined as one or more bits of data, address, and/or control. "Code" includes software or firm-ware that, when executed, performs certain functions. Examples of code include an application, an applet, boot code, or any other series of instructions.

Software implementing the methods and system implementable by system 10 can be stored in the memory of a computer system as a set of instructions to be executed. In addition, the instructions to perform the method and system as described above could alternatively be stored on other forms of machine-readable media, including magnetic and optical disks. For example, the method of the present invention could be stored on machine-readable media, such as flash memory, magnetic disks, or optical disks are accessible via a disk drive (or computer-readable medium drive). Further, the instructions can be downloaded into a computing device over a data network in a form of an executable version for self-installation.

Alternatively, the logic to perform the methods and systems as discussed above, could be implemented in additional computer and/or machine readable media, such as discrete hardware components as large-scale integrated circuits (LSI's), application-specific integrated circuits (ASIC's), or firmware such as electrically erasable programmable read-only memory (EEPROM's); or spatially distant computers relaying information through electrical, optical, acoustical and other forms of propagated signals (e.g., radio waves or infrared optical signals).

Figure 2:
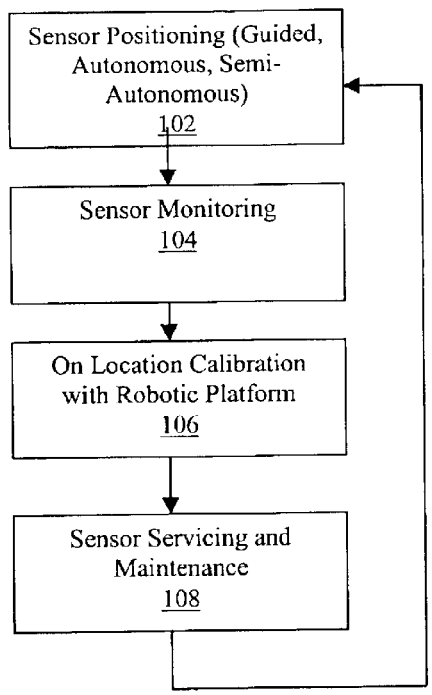
FIG. 2 illustrates operation of a robotic platform.
Figure 2:
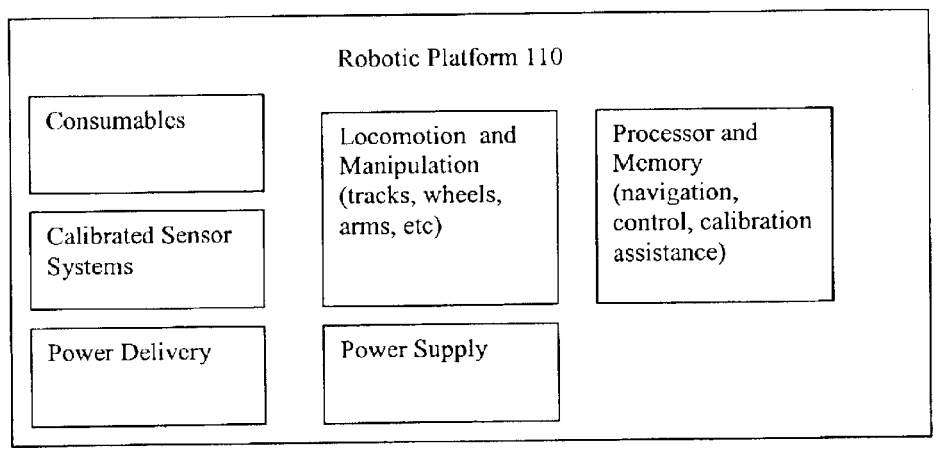

The details of the mobile robotic service unit may be better understood with reference to FIG. 2, which schematically illustrates functionality of a sensor/robot monitoring system and various supported operational modules of a robotic platform 110 (corresponding to mobile robotic service unit 20 and its sensor 22 of FIG. 1) suitable for servicing such a system. As seen in FIG. 2, a robotic platform 110 that can include facilites for locomotion and manipulation; on-board processing and memory for navigation, control, calibration assistance; and a power supply. Other onboard systems that directly affect sensor operation can include consumables (e.g. water, replacement sensor cartridges, etc), power delivery to the sensor platform (e.g. battery replacement, inductive or direct recharging, etc), and the onboard calibration sensor to provide. In operation, the robotic platform 110 typically allow for sensor positioning 102, sensor monitoring 104, on location calibration 106, and sensor servicing and maintenance 108.

Figure 3:
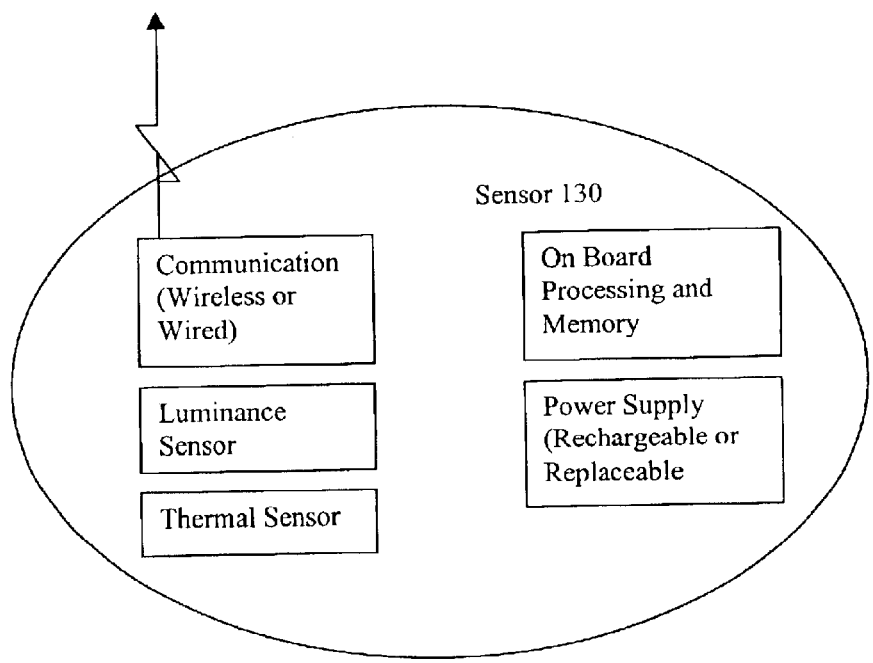
FIG. 3 illustrates components of a sensor platform.

As seen in FIG. 3, the sensor platform can include a sensor 130 that communicates data through a wireless or wired data link to the robot or another computer system, and contains one or more calibrated sensors (e.g. a luminance sensor, thermal sensor, etc.) The sensor can also have some limited processing and memory functionality, allowing for initial data processing and compression that reduces communication bandwidth requirements for sensor data monitoring. The sensor 130 can use long life batteries (e.g. lithium batteries), be hardwired into a suitable house current or low voltage electrical system, or be capable of having its batteries replaced or recharged (by direct current or inductive recharging.

In one example of an embodiment of a system, a "PlantCare" system was constructed to explore issues associated with deployment of a zero-configuration and distraction-free system for the automatic care of houseplants. Each plant in a designated environment was provided with a wireless sensor placed in its pot and serviced by a robot that delivered water to the plants.

In the PlantCare system, wireless sensor nodes are placed both on the robot and in the immediate vicinity of selected plants. The sensors in the plants provided a continuous stream of data reflecting their state while the sensor node on the robot is used to calibrate the sensors. While the sensors in the plants and on the robot vary slightly, the wireless nodes are identical. PlantCare's sensors are built as a "mote" sensor platform operating at 3V and assembled from off-the-shelf components that include an 8-bit microcontroller, a two-way 916 MHz radio for communication, and an expansion connector that facilitates connection of environmental sensors. TinyOS, a small, real-time, modular operating system that supports ad-hoc networking to allow motes to communicate both with each other and with a base station is used in the sensor platforms. Environment sensing hardware consisted of a photo-resistor for measuring light levels, a thermistor for measuring temperature, an irrometer for measuring soil moisture content, and a sensor that monitors the current charge of the power source. In addition, the sensor nodes in our plants were augmented with a custom power system in which capacitors replace traditional batteries and can be recharged using an inductive coil to support power delivery.

The wireless network contains a single base station mote, which by virtue of being attached to the serial port of an Internet-connected PC served as the physical link between the wireless sensor network and the PlantCare services. The base station listened to the sensor network for messages containing sensor readings and forwards these messages to the serial port. The robot hardware platform included a Pioneer 2-DX mobile robot augmented with custom hardware for watering plants, recharging the robot, recharging remote sensors, and sensing environmental conditions for calibration purposes. To deliver water to the plants, the robot was fitted with a small water tank, dispensing spout, and pump. To deliver power to wireless sensors an inductive charging coil was positioned near the watering spout. Similarly, another paddle-shaped inductive charge coil has been added to the robot to allow it to recharge itself at its "maintenance bay". In order to support calibration, the robot included a sensor node that was human-calibrated. Finally, a small microcontroller board allowed software on the robot to both control and read the state of this collection of custom hardware. Both this microcontroller and the laser scanner the robot uses for navigation were connected to a laptop that runs the robot's control and navigation algorithms and is in turn connected to the network via an IEEE 802.11b wireless card. Lastly, the robot has a maintenance bay it uses to automatically charge its own batteries and refill its water reservoir. The bay has a water supply with a spout for dispensing water to the robot, and a charging system matched to the robot's induction coil.

Inductive charging was used for both the sensors and the robot in order to reduce associated electrical dangers. The measured efficiency of inductively charging the sensors was around 70% of the baseline efficiency achieved with a shielded cable. This inefficiency reduced the amount of time the robot can function without recharging, thereby resulting in more frequent visits to the maintenance bay. The robot navigation system included a reactive collision avoidance module, a module for map building and path planning, and a localization module. All components used probabilistic methods to deal with uncertain sensor information.

The PlantCare software includes services that collectively provide both the high-level application logic as well as the low-level driver-like code that communicates with hardware and external software. Specific to the sensor network, there are services that independently receive data from the sensor base stations, unpack the data from its proprietary form, calibrate the data reading based on previously collected calibration data, and store the readings for future use by applications. The services pertaining to the robot consist of a low-level service that knows how to activate the robot's sensors and actuators, and a high-level service that encapsulates the understanding of our application-specific robotic tasks such as watering plants and delivering power to the motes.

In one example PlantCare operation, an uncalibrated sensor was deployed and calibrated in-place. After a period of operation the environmental characteristics the sensor was measuring were significantly altered. During this test, the subsequently reported readings then no longer fell within the range of the previously collected calibration data, which forced the system to gather additional calibration data. This mimics the previously mentioned example of a temperature sensor that is calibrated during summertime conditions but needs further calibration at the onset of winter. A gross change in sensor behavior was also simulated by physically obscuring the sensor. Once the resulting measurement error was detected by the system during a simulated maintenance check performed by the robot, the old calibration data was discarded and new calibration data was collected.

The experiment setup included use of a darkroom with a single constant intensity light source, and a single wireless sensor node equipped with a light sensor. The light source was passed through two polarizing filters, one of which is rotated at set intervals to make the intensity of the emitted light approximate a sine wave. For the first half of the experiment the rotation of the filter was limited between 0 and 45 degrees. This creates a wave that is cut off at half the possible amplitude. After two periods of this smaller wave the rotation of the filter was extended to the full range of 0 to 90 degrees to create a change in environmental conditions. This full range of light was projected onto the sensor for two full periods. The sensor was then covered by a semi-transparent filter to emulate degradation of the sensor. Finally, the full range of light was again projected onto the partially obscured sensor for two periods.

During the entire experiment, the wireless node reported its light readings to a base station via its radio. This data was stored in a database and post-processed using linear regression to convert these raw sensor readings into luminance values. When the algorithm needed a new calibration point, the raw sensor voltages were paired with the actual light intensity to simulate a robot with a perfect sensor.

Figure 4:
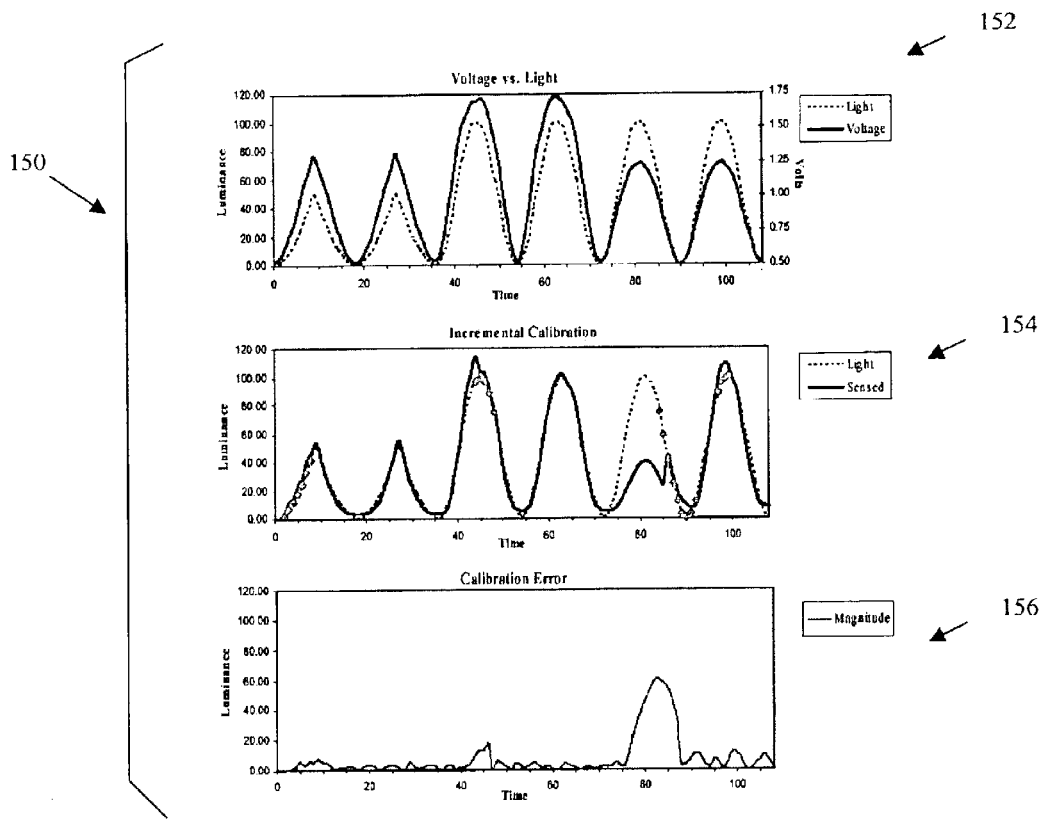
FIG. 4 graphically illustrates calibration errors in luminance sensors maintained by a robotic platform in accordance with one embodiment.

FIG. 4 is a series of related graphs 150 (graphs 152, 154, and 156) that represent different aspects of the data collected during the described experiment. In all of these graphs the vertical axis shows either volts or luminance, while the horizontal axis always shows time. In the first graph 152, the solid line shows the voltage values measured by the sensor during the experiment, compared with the broken line showing the actual luminance of the light source. Note that until the sensor is obscured, the voltage readings reach higher on the graph than the luminance values. Once the sensor is obscured, the voltages measured are lower though the luminance has not changed. Without recalibration, the sensor readings cannot be translated accurately across the entire time line.

The second graph 154 in this series compares the calibrated sensor readings to the actual luminance. The markers on the broken line represent times at which the system collected calibration samples. Moving from left to right, the system initially collected eight calibration points. Once the measured luminance starts to fall, no additional calibration points are collected, as the system is comfortable with the range of data it had already collected. Note also that the measured line accurately tracks the actual luminance except in the peaks and troughs of the graphs.

Midway through the third period, two things happen. The difference between the calibrated readings and the actual luminance increases. This is because the regression algorithm was being forced to make predictions outside its range of collected data. When the system realized this, it collected an additional four calibration points after a delay approximating the navigation latency of the robot. After incorporating the additional points, the measured values again track the actual luminance well.

Two thirds of the way through the experiment the sensor was covered with a filter to change its characteristics. Since the system was unaware of this, the converted measurements are in fact quite inaccurate. This could not be detected by the system and would have continued until a routine robotic check of the sensor revealed the inaccuracy. The delay of a few readings approximates the wait until the next check of the sensor. At this point, the system realized a significant change in the sensor had occurred, discarded all of its calibration data, and began collecting new data. After the recalibration period, the readings again track the actual luminance well.

Lastly, the third graph 156 in this series shows the error between the calibrated sensor readings and the actual luminance. During the initial calibration period there is higher than average error. Another period of increased error occurs when the environmental conditions change and only settles down once additional calibration data is gathered. At the end of the measurement there is a very large spike of error while the system continues to use calibration data that has become inaccurate. Once the error is detected and new calibration data is gathered, the error again decreases. Even after recalibration the error does not diminish to the extent it did following initial calibration. This is due to the fact that obscuring the sensor rendered it less sensitive to light, somewhat compromising its accuracy.

As will be understood, alternative calibratable sensor systems that support sensor dissemination, retrieval, and calibration are particularly useful for hostile environments that are dangerous to personnel, too remote for frequent visits for manual service/calibration, or too small for easy access by personnel. Such environments may include those having high or low ambient temperatures, toxic atmospheres, high pressure, or involve exposure to hazardous biomaterials. For example, robotic calibration of emplaced chemical or biosensors in wells monitoring long term groundwater contamination may involve use of robotic arms or crawlers that are maneuvered down a well head for in site placement and calibration. In other embodiments, radiation sensors operable in high radiation zones can be calibrated.

In still another example of an embodiment intended to illustrate feedback control of sensor/actuator systems, consider an environment where substantially uniform spectral light levels must be maintained in the presence of movable blocking or filtering objects, including but not limited to people walking through the monitored environment. Remotely controlled lights can be level adjusted, turned on or off, rotated or moved on track ways. For more complex systems, adaptive optics that include multiple mirrors or active light warping lens elements can be used for precision control as the environment changes. Calibratable spectral sensors can be distributed through the environment and connected through a suitable negative feedback system to the remotely controlled lights. Maintenance or calibration of the large number of light spectral sensors can be managed by a Mobile Robotic Spectral Uniformity Light Unit (MR SULU), with maintenance operation initiated by a suitable 'engage' command. Properly navigated, MR SULU could redistribute sensors, calibrate already distributed sensors, and retrieve failed sensors (e.g. a failed 'red' sensor of multispectral sensor array) to maintain uniform light levels. In certain embodiments, MR SULU could be used to adjust and monitor the light generating units as well as the light sensing units, (e.g. warping a lens element to narrow a unphased light beam) This is particularly useful in distant areas such as ceiling mounted recessed lighting where no man may easily go due to spatial constraints.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Accordingly, it is the following claims including any amendments thereto that define the scope of the invention.

The claimed invention is:

1. A sensor calibration method comprising:
   identifying locations, each location corresponding to at least one of a plurality of sensors positioned in an environment;
   navigating a robotic platform having at least one set of calibrated sensors mounted on the robotic platform, the robotic platform capable of maneuvering around the environment to positions, wherein each position is adjacent to at least one of the plurality of sensors; and
   calibrating at least one of the plurality of sensors positioned in the environment using calibration information from the at least one set of calibrated sensors mounted on the robotic platform.

2. The sensor calibration method of claim 1, further comprising storing information in a sensor calibration database to track temporal changes in calibration error.

3. The sensor calibration method of claim 1, further comprising repositioning of at least one of the plurality of sensors positioned in the environment.

4. The sensor calibration method of claim 1, further comprising replacement of at least one of the plurality of sensors positioned in the environment.

5. The sensor calibration method of claim 1, further comprising placing at least one uncalibrated sensor positioned in the environment.

6. The sensor calibration method of claim 1, further comprising modeling of sensor characteristics to detect failure modes requiring attention by the robotic platform.

7. The sensor calibration method of claim 1, further comprising recharging of a power source corresponding to at least one of the plurality of sensors positioned in the environment, the recharging performed by the robotic platform.

8. The sensor calibration method of claim 1, further comprising replacement of a power source corresponding to at least one of the plurality of sensors positioned in the environment, the replacement performed by the robotic platform.

9. The sensor calibration method of claim 1, wherein the plurality of sensors positioned in the environment measure temperature variations.

10. The sensor calibration method of claim 1, wherein the plurality of sensors positioned in the environment are at least intermittently maintainable in wireless communication with a sensor monitoring system.

11. An article comprising a storage medium having stored thereon instructions that when executed by a machine result in:
    identifying locations, each location corresponding to at least one of a plurality of sensors positioned in an environment;
    navigating a robotic platform having at least one set of calibrated sensors mounted on the robotic platform, the robotic platform capable of maneuvering around the environment to positions, wherein each position is adjacent to at least one of the plurality of sensors; and
    at least one of the plurality of sensors positioned in the environment using calibration information from the at least one set of calibrated sensors mounted on the robotic platform.

12. The article comprising a storage medium having stored thereon instructions according to claim 11, further comprising storing information in a sensor calibration database to track temporal changes in calibration error.

13. The article comprising a storage medium having stored thereon instructions according to claim 11, further comprising repositioning of at least one of the plurality of sensors positioned in the environment.

14. The article comprising a storage medium having stored thereon instructions according to claim 11, further comprising replacement of at least one of the plurality of sensors positioned in the environment.

15. The article comprising a storage medium having stored thereon instructions according to claim 11, further comprising placing at least one uncalibrated sensor positioned in the environment.

16. The article comprising a storage medium having stored thereon instructions according to claim 11, further comprising modeling of sensor characteristics to detect failure modes requiring attention by the robotic platform.

17. The article comprising a storage medium having stored thereon instructions according to claim 11, further comprising recharging of a power source corresponding to at least one of the plurality of sensors positioned in the environment, the recharging performed by the robotic platform.

18. The article comprising a storage medium having stored thereon instructions according to claim 11, further comprising replacement of a power source corresponding to at least one of the plurality of sensors positioned in the environment, the replacement performed by the robotic platform.

19. The article comprising a storage medium having stored thereon instructions according to claim 11, wherein the plurality of sensors positioned in the environment measure temperature variations.

20. The article comprising a storage medium having stored thereon instructions according to claim 11, wherein the plurality of sensors positioned in the environment are at least intermittently maintainable in wireless communication with a sensor monitoring system.

21. A sensor calibration system comprising:
    a robotic platform able to navigate to a plurality of sensors positioned in an environment, the robotic platform having at least one set of calibrated sensors mounted thereon, the robotic platform capable of maneuvering around the environment to positions, wherein each position is adjacent to at least one of the plurality of sensors; and
    a sensor monitoring system to determine calibration timing of the plurality of sensors by the robotic platform.

22. The sensor calibration system of claim 21, further comprising a sensor calibration database to store information for tracking temporal changes in calibration error.

23. The sensor calibration system of claim 21, wherein the robotic platform is capable of repositioning the plurality of sensors positioned in the environment.

24. The sensor calibration system of claim 21, wherein the robotic platform is capable of replacing the plurality of sensors positioned in the environment.

25. The sensor calibration system of claim 21, wherein the robotic platform is capable of placing uncalibrated sensors positioned in the environment.

26. The sensor calibration system of claim 21, further comprising a sensor characteristic modeler to detect failure modes requiring attention by the robotic platform.

27. The sensor calibration system of claim 21, wherein the robotic platform is capable of recharging of a power source corresponding to at least one of the plurality of sensors positioned in the environment by the robotic platform.

28. The sensor calibration system of claim 21, wherein the robotic platform is capable of replacing a power source corresponding to at least one of the plurality of sensors positioned in the environment.

29. The sensor calibration system of claim 21, wherein the plurality of sensors positioned in the environment measure temperature variations.

30. The sensor calibration system of claim 21, wherein the plurality of sensors positioned in the environment are at least intermittently maintainable in wireless communication with a sensor monitoring system.

* * * * *

UNITED STATES PATENT AND TRADEMARK OFFICE
CERTIFICATE OF CORRECTION

PATENT NO. : 6,795,786 B2  Page 1 of 1
DATED : September 21, 2004
INVENTOR(S) : LaMarca et al.

It is certified that error appears in the above-identified patent and that said Letters Patent is hereby corrected as shown below:

Column 3,
Line 17, delete "facilites" and insert -- facilities --.

Signed and Sealed this

Seventeenth Day of May, 2005

JON W. DUDAS
*Director of the United States Patent and Trademark Office*